(12) United States Patent
Overton et al.

(10) Patent No.: US 6,602,017 B2
(45) Date of Patent: Aug. 5, 2003

(54) CONNECTOR DEVICE ASSEMBLY

(76) Inventors: Michael Derek Overton, 80 Elm Park Road, Reading RG 30 2TN (GB); Charles William Stratford Presant, 73 Broom Hill, Cookham Rise, Berkshire SL6 9LJ (GB)

( * ) Notice: Subject to any disclaimer, the term of this patent is extended or adjusted under 35 U.S.C. 154(b) by 0 days.

(21) Appl. No.: 09/439,345

(22) Filed: Nov. 15, 1999

(65) Prior Publication Data
US 2002/0164199 A1 Nov. 7, 2002

(30) Foreign Application Priority Data
Nov. 13, 1998 (GB) ................................ 9824835

(51) Int. Cl.⁷ ................................ F16B 9/00; F16B 7/04
(52) U.S. Cl. ........................ 403/205; 403/4; 403/364; 403/217; 403/218
(58) Field of Search ................ 403/205, 364, 403/367, 334, 4, 175, 217, 218

(56) References Cited

U.S. PATENT DOCUMENTS

| | | | |
|---|---|---|---|
| 2,291,078 A | * 7/1942 | Harris | 403/205 |
| 3,737,180 A | 6/1973 | Hayes, Jr. et al. | |
| 4,189,810 A | 2/1980 | Beziat | |
| 4,219,081 A | * 8/1980 | Howe | 403/364 X |
| 4,266,578 A | 5/1981 | Swain et al. | |
| 4,580,922 A | * 4/1986 | Coppa | 403/205 X |
| 4,932,807 A | * 6/1990 | Rhodes | 403/334 X |
| 5,709,500 A | * 1/1998 | Mizelle et al. | 403/364 |
| 5,908,260 A | * 6/1999 | Watson et al. | 403/205 |

FOREIGN PATENT DOCUMENTS

| | | | |
|---|---|---|---|
| GB | 552105 | 3/1943 | |
| GB | 2227050 A | * 7/1990 | 403/205 |
| GB | 2 316 121 | 2/1998 | |

* cited by examiner

Primary Examiner—Lynne H. Browne
Assistant Examiner—Ernesto Garcia
(74) Attorney, Agent, or Firm—Young & Thompson

(57) ABSTRACT

A connector device assembly of the add-on type and suitable for securing a second member, such as a metal tube, as a branch extending from a position between the ends of a first member, such as another metal tube, without the need to slide components along the first member includes two connector devices each having a first body region which defines a recess formation to accommodate a first member of a structural assembly, and at least one of the connector devices including a second body region for securing relative to a second member which is required to be connected to the structural assembly, the two connector devices each having at least one edge formation provided with an aperture which extends substantially parallel with the longitudinal direction of the first member and respective edge formations of the two connector devices being aligned in the assembly to receive a locking member extending therethrough, the locking member being arranged in the assembly to be loaded substantially only in shear to hold the connector devices in position relative to one another and the first member.

9 Claims, 7 Drawing Sheets

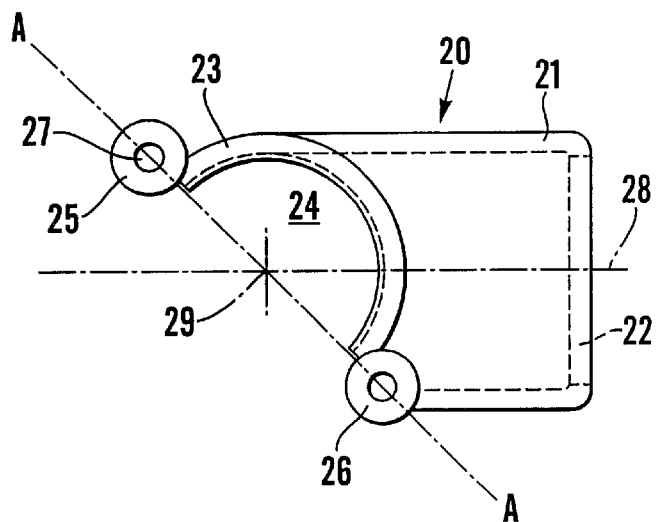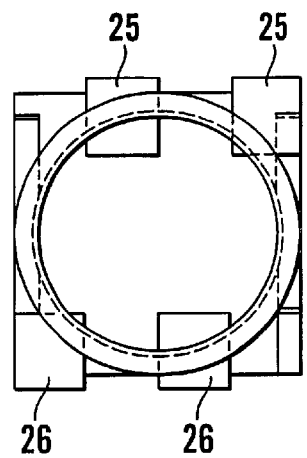
Fig. 3a
Prior Art
Fig. 3b
Prior Art
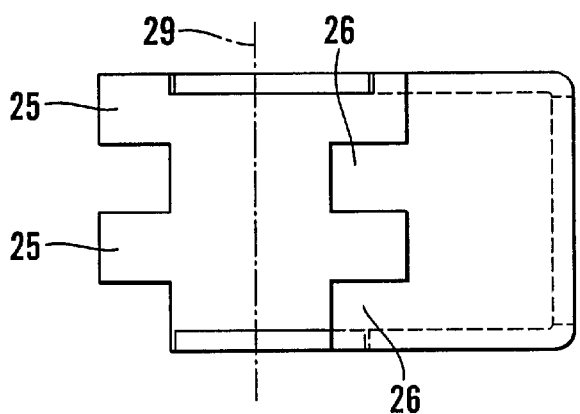
Fig. 3c
Prior Art

CONNECTOR DEVICE ASSEMBLY

BACKGROUND OF THE INVENTION

The present invention relates to a connector device assembly, and a method, for forming a structural interconnection between two rigid members.

More specifically, but not exclusively, the invention relates to a connector device assembly of an "add on" type, sometimes known as a split type connector device assembly, which allows an existing structural assembly of interconnected members to be extended or modified without the need to dismantle any part of the existing assembly.

The structural assembly with which the connector device assembly of the present invention may be used to advantage, and to which the method may be applied, may be of the type comprising rods or tubes interconnected by multi-way connectors for joining two or more lengths of said rods or tubes. One or more pairs of said "lengths" typically may each be aligned sections of a continuous length of rod or tube. Additionally or alternatively the assembly may comprise one or more lengths of a rod or tube having an end which terminates at the connector device.

Examples of structural assemblies to which the present invention relates include handrails, balustrades, shelving and storage systems, climbing frames and scaffolding.

'Add-on' devices of various types are known for allowing additional rods or tubes to be connected to an existing structural assembly of rods or tubes without the need to dismantle any part of the existing assembly.

A particularly commonly used and simple type of an add-on connector device assembly comprises a pair of semi-cylindrical connector devices which, in combination, can encircle a rod or tube, and which are held together by retention nuts acting on bolts which extend through aligned, drilled and tapped apertures in the connector devices. Either the bolts may extend in a generally tangential direction perpendicular to the longitudinal direction of the or each encircled rod or tube, as shown in U.S. Pat. No. 4,864,795 (and as illustrated in FIG. 1 hereof), or parallel with said longitudinal direction as described in GB-A-552105 or in our GB-A-2316121 (illustrated in FIGS. 2 to 5 hereof).

Although the use of add-on type connector devices advantageously allows a connection to be made to an existing structural assembly without the need to dismantle any part of the existing structure, the devices often are difficult to install especially when assembling at height or at a position of extreme reach. Notably, two pairs of hands are required, one pair to hold the two connector devices together in aligned orientation and the other pair to position retention bolts and tighten the nuts.

In addition to the difficulty of forming the assembly with a single pair of hands, it can also be difficult always to ensure that a pair of the semi-cylindrical connector devices have been properly assembled with an appropriate torque loading of the bolts. If the torque is too great there is a risk of fracture either on assembly or during subsequent service, or damage to the tapped holes. If the torque is too low, there is a risk of vibration or thermal expansion effects relaxing the interconnection of the connector devices.

SUMMARY OF THE INVENTION

An object of the present invention is provision of a connector device assembly and a method which more easily allows additions to be made to an existing structural assembly.

According to one aspect of the present invention an add-on type connector device assembly comprises at least two connector devices, each connector device having a first body region which defines a recess formation to accommodate a part of the outer periphery of a first rigid member of a structural assembly, and at least one of the connector devices comprising a second body region for securing relative to a second rigid member which is required to be connected to the structural assembly, said two connector devices each having at least one edge formation provided with an aperture which extends substantially parallel with the longitudinal direction of said first rigid member and respective edge formations of said two connector devices being aligned in the assembly to receive a locking member extending therethrough, the locking member being arranged in the assembly to be loaded substantially only in shear to hold the connector devices in position relative to one another and the first rigid member.

According to another aspect of the present invention an add-on type connector device assembly comprises at least two connector devices, each connector device having a first body region which defines a recess formation to accommodate a part of the outer periphery of a first rigid member of a structural assembly, and at least one of the connector devices comprising a second body region for securing relative to a second rigid member which is required to be connected to the structural assembly, said two connector devices each having at least one edge formation provided with an aperture which extends substantially parallel with the longitudinal direction of said first rigid member and respective edge formations of said two connector devices being aligned in the assembly to receive a locking member extending therethrough, the locking member being an interference type fit in at least one aligned aperture of each of said two connector devices.

According to a further aspect of the present invention an add-on type connector device assembly comprises at least two connector devices, each connector device having a first body region which defines a recess formation to accommodate a part of the outer periphery of a first rigid member of a structural assembly, and at least one of the connector devices comprising a second body region for securing relative to a second rigid member which is required to be connected to the structural assembly, said two connector devices each having at least one edge formation provided with an aperture which extends substantially parallel with the longitudinal direction of said first rigid member and respective edge formations of said two connector devices being aligned in the assembly to receive a locking member extending therethrough, the locking member being of a kind which has been inserted and secured in said aligned apertures only by action applied to only one end of the locking member.

Preferably said applied action is one which has caused the locking member to become tightly secured in at least one of the aligned apertures through which it extends.

Examples of suitable locking members include expansion type bolts such as through bolt anchors and expansion sleeve anchors, for example as supplied under the trade name of "Parabolt", and toggle bolts. All or at least a part of the length of said types of bolts are expandable to fully occupy an aperture by operating on only one end of the bolt.

Another suitable type of locking member is a tapered pin which can be tapped into place with a hammer to form an interference fit in at least one aligned aperture of each of two connector devices. In general a suitable tapered pin will have a taper (as measured relative to the longitudinal direction of the pin) of between 0.005 and 0.1 millimetres per centimetre, more preferably between 0.01 and 0.05 mm./cm. A taper of 0.02 mm./cm. is found to be particularly suitable. Optionally the smaller of the two taper ends of the pin extends axially outwards of an aperture thereby to facilitate drifting out of the pin if the assembly requires to be dismantled. The pin may have a head portion to limit axial movement and prevent over stressing of the parts of the connector devices which define the apertures. The length of the pin may be less than the length of the aligned apertures. The pin may be toleranced so as normally to lie substantially wholly within said length of the apertures.

In an assembly which employs tapered pins of a circular section, the pin diameter typically may have a tolerance which complies with British Standard BS 46pt3.

Optionally the material of a tapered pin has a hardness which is less than that of the material which defines the apertures of the connector devices.

Further examples of locking members include a pan head type rivet, and hollow centred spring loaded pins such as are available under the name "Spirol". Other suitable types include those which have, at at least one end, a resiliently biased stop to provide axial location, e.g. by a snap-fit type action.

Whilst it is required by one aspect of the present invention that the locking member is of a kind inserted and tightened in an aperture only by action at one end of the locking member, it is to be understood that other locking means may be provided additionally and/or subsequently. Thus a captive locking device such as a star-lock push-on fastener, a "flat nut", or a latch pin may be provided at an exposed part of the other end of the pin or other such locking member.

The invention envisages that preferably the apertures in the edge formations of a connector device are bereft of a screw thread formation. The apertures may be of a smooth bore type, and particularly if they are intended to receive a tapered pin they may have been sized by reaming.

A reamer or other means may be employed to provide a connector device with cylindrical apertures and/or one or more tapered apertures. All or only some of the apertures which form an aligned series of apertures in an assembly of two or more connector devices may be tapered.

Neighbouring edge formations in an assembly may comprise more than two aligned apertures and the locking member may be a tight fit in all or more than two aligned apertures. In an aligned series of apertures, two or more successive apertures may be tapered and arranged to provide a through-passage zone of uniformly tapering cross-section whereby a tapered pin of corresponding taper angle may be fitted securely in to each of said two or more successive apertures.

If the connector devices of an assembly are of a kind which can be interconnected relative to one another in only one configuration, it is taught that the whole length of a through-passage defined by the aligned apertures may taper uniformly. If the connector devices of an assembly are of a kind which can be interconnected relative to one another in more than one configuration, it may be provided that in each relative configuration some but not all of the successive aligned apertures may taper uniformly.

In one preferred construction two connector devices encircle a first rigid member and each edge formation has a pair of aligned apertures which in the assembly lie interdigitated with the apertures at a neighbouring edge of the other connector device. An example of a construction of that type and which is reversible to lie in either of two configurations is shown in FIGS. 2 to 5 hereof. The devices can be interconnected in either of two configurations as more fully described in GB-A-2 316 121A, and selected apertures may be tapered to ensure that in either of the configurations two, but not all, of the aligned apertures provide a through-passage zone which is uniformly tapered. Thus, each edge formation may be regarded as having an outer aperture and an inner aperture which in the assembly lies sandwiched between the outer and inner apertures of the other edge formation with which it is interdigitated. The outer apertures may taper with reducing diameter in a direction towards the associated inner aperture, and said associated inner aperture may taper in a reverse direction, i.e. reducing in diameter in a direction towards the associated outer aperture, with the taper of the inner aperture decreasing from a maximum diameter corresponding to the minimum diameter of the taper in the outer aperture so that in the assembled condition the adjacent inner and outer apertures provide a uniformly tapering through passage zone. A taper pin inserted in either end of the aligned apertures will therefore be able to fit firmly into two of the four aligned apertures through which it extends.

Preferably at least one of the connector devices is provided with retention means such as a grub screw operable to lock the assembled connector devices to said first rigid member.

According to yet another aspect of the present invention a method of forming a structural interconnection between two rigid members comprises use of an add-on type connector device assembly which comprises at least two connector devices, each connector device having a first body region which defines a recess formation to accommodate a part of the outer periphery of a first rigid member to be connected to a second rigid member, at least one of the connector devices comprising a second body region for securing relative to an end of a second rigid member which is required to be connected to the structural assembly, said two connector devices each having at least one edge formation provided with an aperture which extends substantially parallel with the longitudinal direction of said first rigid member, apertures of the respective edge formations of said two connector devices being aligned in the assembly to receive a locking member extending therethrough, retention means associated with one of the connector devices and operable to secure an assembled plurality of connector devices in position relative to the first rigid member, wherein the method comprises first employing the locking member to provide an interconnection of the connector devices without creating any substantial axial pre-load between the connector devices in said longitudinal direction and then operating the retention means simultaneously to secure a connector device relative to the first rigid member and apply shear load to the locking member.

The method is particularly suitable for use with connector devices having two pairs of interdigitated lugs with commonly aligned apertures as disclosed in our GB-A-2316121.

The aforedescribed method is particularly suitable for use in creating an assembly which utilises a locking member which is or may be a relatively loose fit in each of the aligned apertures through which it extends, or, if the other edges of the device are hingedly connected, by a loose type hinge pin that permits non-axial relative movements. Suitable loose-fit type locking members include those of a type which have a toggle-fitted end for maintaining axial location, or snap action retention stops.

The first body region of a connector device may comprise first and second end formations arranged spaced apart by said recess formation in a non-symmetrical manner relative to an axis that intersects the longitudinal direction of the first rigid member whereby the first end formation lies between said second body region and said second end formation. Said second end formation may be adapted to co-operate with that of the other connector device to embrace a first rigid member and form a structural interconnection between the rigid members. The second region of the body may have a major axis which is substantially aligned relative to the length direction of at least an end portion of said second rigid member, and a plane intersecting the lengths of the first and second end formations may lie substantially obliquely relative to said major axis.

The end zone of the first region preferably lies, in effect, in a plane which is parallel with, and more preferably intersects, a major axis of the first rigid member.

The end zone of the first body region preferably has associated therewith a recess of substantially semi-cylindrical shape. Thus parts of the end zone at either side of the recess may lie at diametrically opposite positions of a cylindrical outer surface of a rod or tube which fits into the recess. The recess preferably comprises at least a pair of axially spaced semi-cylindrical bearing surfaces, known also as sizing rings, against which a rod or tube of substantially equivalent outer diameter may rest and be secured.

An assembly of the present invention may comprise a connector device of a type which comprises a second body region for securing relative to a second rigid member and a region having an end zone which comprises a recess formation to accommodate a part of the outer periphery of the first rigid member, the end zone additionally comprising a first end formation which lies between said second body region and a major axis of said recess formation and a second end formation which lies beyond said major axis.

The major axis of said second region of the body may intersect or lie off-set relative to the major axis of the recess or the first rigid member.

The end zone preferably comprises end formations which in effect lie in a plane inclined at 45 degrees to the major axis of said second region. Two connector devices with said 45 degree feature therefore may be orientated either to provide an in-line interconnection of the two rigid members, to lie typically but not necessarily at right angles to a first rigid member contained within confronting recesses, or a right angled interconnection between said two rigid members.

It is not essential to all aspects of the present invention that the aforedescribed reversibility feature is present. Thus, an end zone may lie at 90 degrees to the major axis of said second region.

Other angles may be employed and still provide a reversibility feature as described in the preceding paragraph, e.g. a 30 degree inclination to the major axis will give the option for an in-line or 60 degree interconnection.

The end formations preferably are profiled and arranged, e.g. with an off-set configuration of lug portions, so that the end formations of respective connector devices may lie interdigitated in either of two relative orientations of the devices.

Two connector devices may be pre-assembled with a hinged interconnection of a pair of adjacent edge formations. Another pair of adjacent edges may then be fitted with a locking member arranged to extend through aligned apertures in lug formations as described herein in accordance with the present invention. All locking member apertures of the assembly may be of the same size or some may be smaller than others.

A structural member may be secured in conventional manner to the second body region. A structural member may be received in an end passage of a second body region. The passage may comprise a pair of axially spaced and inwardly extending ribs to act as gauge rings to closely surround an inserted rigid structural member. The end region may comprise a known boss and grub-screw arrangement for securing the structural member in the connector device.

An add-on type connector device as aforedescribed and having a pair of apertured edge formations, such as may be provided by edge lugs, may be used either in combination with a similar connector device or one of a different form. A different form of connector device may feature an additional second body portion so that in combination with the aforedescribed add-on type connector device a total of four rigid members may be added about a first rigid member which is encircled by the connector devices.

BRIEF DESCRIPTION OF THE DRAWINGS

Embodiments of the invention are now described, by way of example only, with reference to the accompanying drawings, in which:

FIGS. 3a, 3b, and 3c are plan, end and side views of the connector device of FIG. 2;

FIG. 9 shows an in-line assembly of two devices showing tail portions of the taper pin of FIG. 6a.

DETAILED DESCRIPTION

Figure 1:
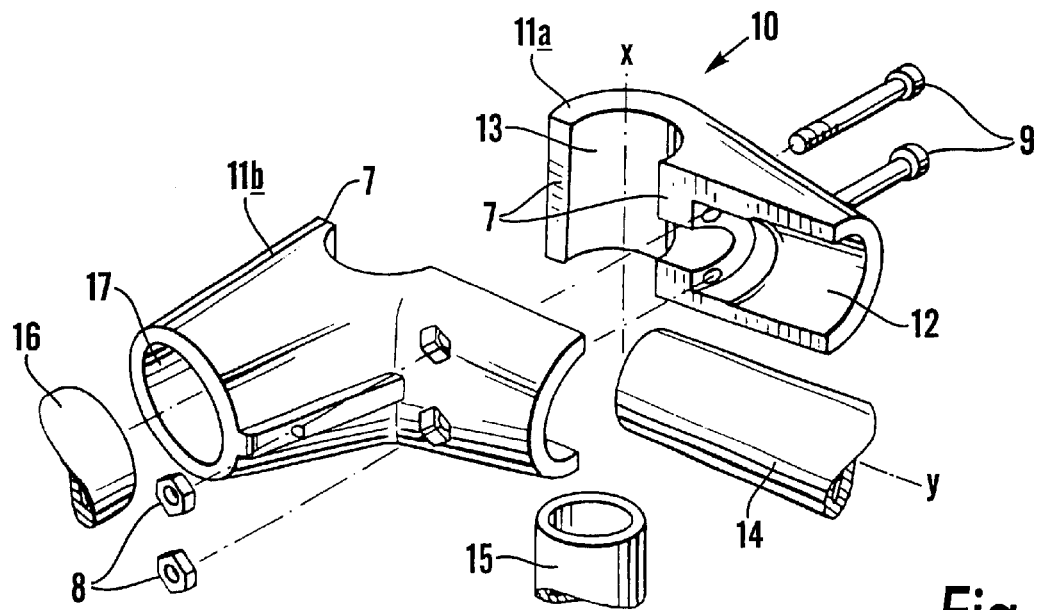
FIG. 1 is a perspective view of a known connector device

FIG. 1 shows a connector assembly 10 comprising two rigid cast connector devices 11a & 11b which define two passage 12, 13 through which tubes 14, 15 extend. A side tube 16 is located in a passages 17 of the connector device 11b. The three tubes are secured to the connector devices by grub screws in bosses (not shown). The assembly is more fully described in U.S. Pat. No. 4,864,795. The two connector devices 11a, 11b are held together about the tubes 14, 15 by threaded bolts 9 and lock nuts 8. The integrity of the assembly is dependent on the bolts 9 being set to the correct torque to resist separation of the connector device surfaces 7 that contact one another whilst also withstanding vibration and thermal expansion effects.

Figure 2:
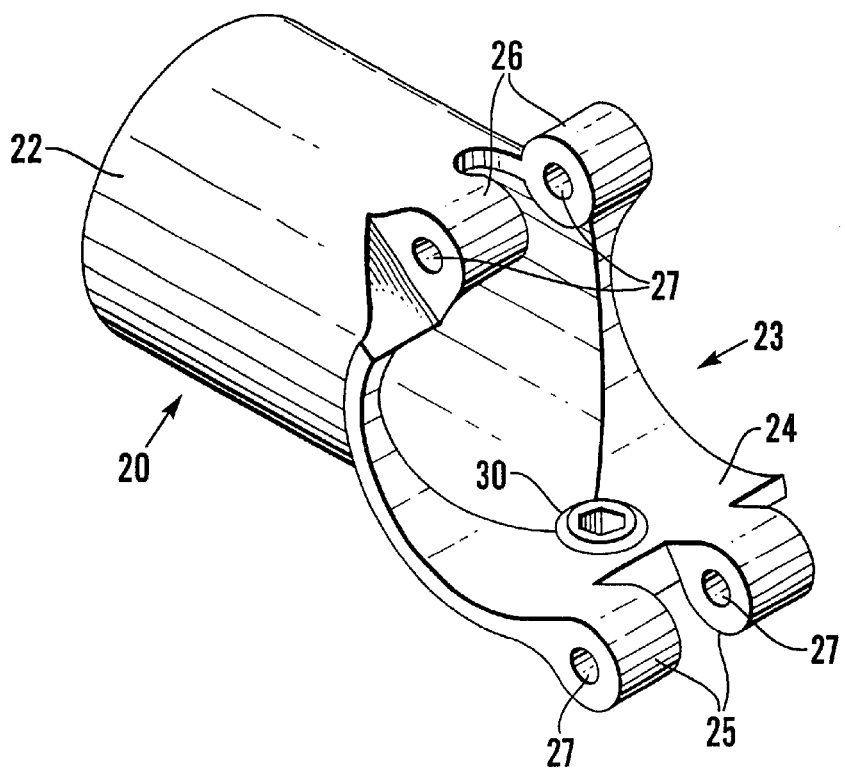
FIG. 2 is a perspective view of another known connector device.

FIG. 2 shows in perspective a connector device for use in forming an assembly of the present invention.

The connector device 20, shown in more detail at FIGS. 3a, b, and c, has a tubular body portion 21 with a central region 22 adapted to receive the end of a side tube (not shown).

The body 21 has another region 23 comprising a recess formation 24 of a semi-cylindrical shape and two pairs 25, 26 of lug formations.

The lug formations in effect lie on a plane A—A (see FIG. 3a) which is oblique, at 45 degrees, relative to the major axis 28 of the region 22. Hence one pair 26 of lug formations lies between the region 22 and a major axis 29 of the recess. The other pair 25 lies beyond the major axis 29 of the recess.

Figure 4:
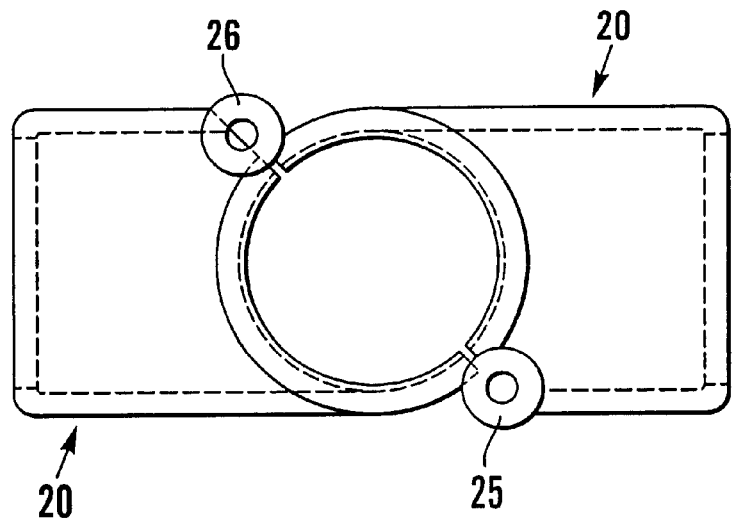
FIG. 4 shows an in-line assembly of two devices of FIG. 2.
Figure 5:
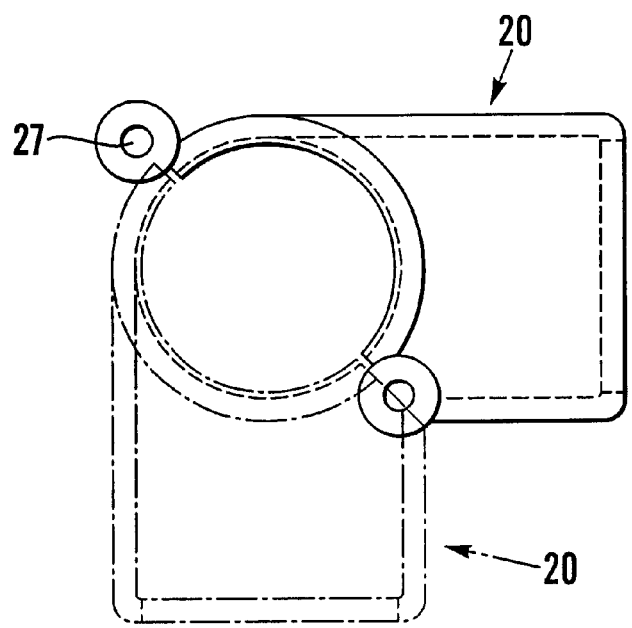
FIG. 5 shows a right angle assembly of two devices of FIG. 2.

The lug formations 25, 26 are arranged off-set as viewed in FIG. 3c. In consequence when two of the connector devices 20 are positioned about a tube, which occupies the recesses 24, the lug formations of the respective pairs may lie aligned and interdigitated irrespective of whether the devices are in-line as in FIG. 4 or at right angles as in FIG. 5.

The connector device 20 is provided with a boss and grub screw (not shown) for retention of the side tube in a known manner.

The lug formations 25, 26 are formed with apertures 27. All apertures are of the same internal diameter and have a smooth bore. Locking members, as described below, extend through aligned apertures 27 to secure the two devices 20 to one another. Another boss and grub screw arrangement 30 (see FIG. 2) is provided at the recess to tighten the connector devices relative to a tube extending through the recesses.

Figure 6A:
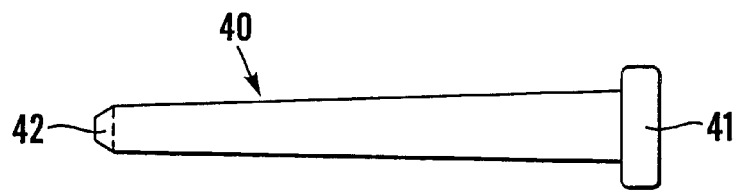
FIGS. 6a to 6e show locking members for use in forming the device of FIGS. 3a–3c into an assembly of the present invention.
Figure 9:
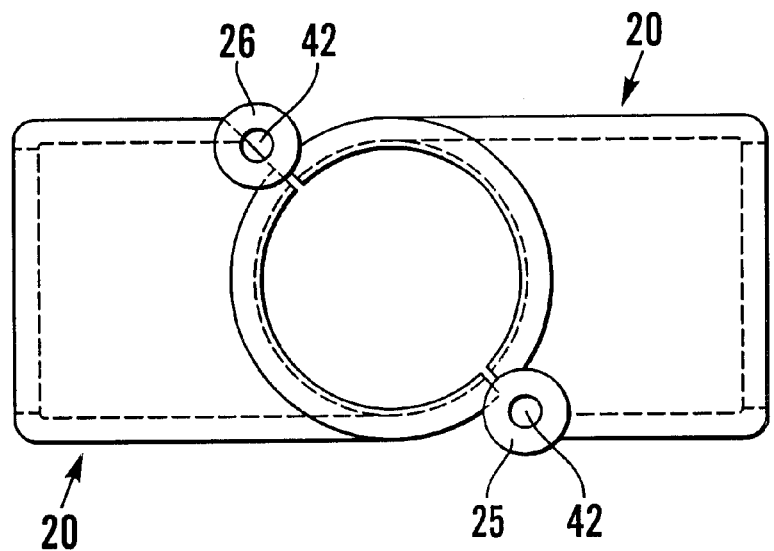
Figure 10:
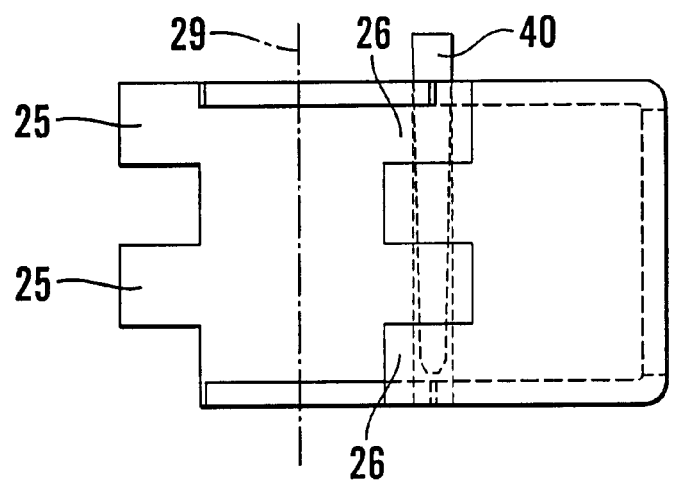

The locking means may comprise a tapered pin 40 as shown in FIG. 6a. Optionally it may have a head portion 41 to limit excessive movement of the pin into apertures and thereby avoid excessive interference fit forces. The taper is 0.02 mm per cm relative to the longitudinal axis of the pin. Optionally the pin also has a tail portion 42 which lies slightly exposed beyond a lug 25, 26 in the assembled condition whereby the pin can be drifted out from the apertures by tapping of the tail part. See FIG. 9.

Figure 6B:
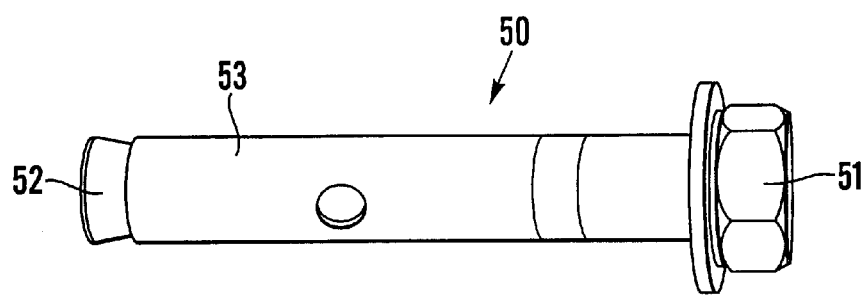
Figure 6C:
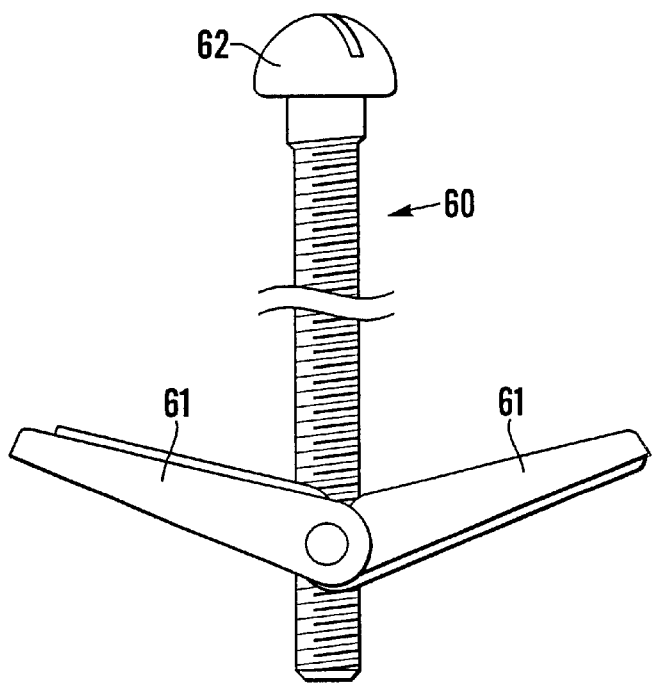

Another suitable locking means is an expansion bolt 50 as shown in FIG. 6b. Rotation of the nut head 51 draws a tapered core 52 towards the nut head, causing a central sleeve 53 to expand and form an interference fit in an aligned aperture of a series of interdigitated lugs. A further example of a suitable locking means is a toggle bolt as shown in FIG. 6c. The spring loaded arms 61 spring outwards to the illustrated position once they have been inserted through an aligned series of apertures. The head 62 is then rotated to bring the arms into an interlocked position relative to the connector device, though not providing any significant axial loading.

Figure 6D:
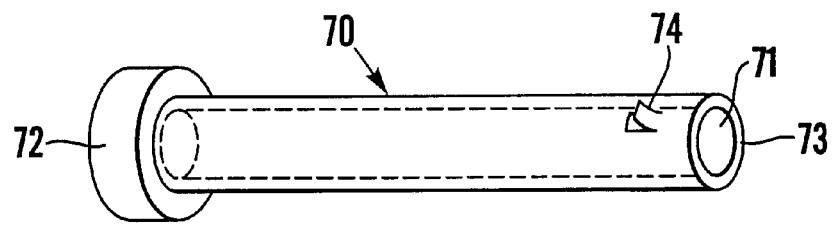

FIG. 6d shows a snap-fit type locking means 70 which comprises a core 71 of plastics or metal and has an integral head portion 72. The core supports a cylindrical sleeve 73 of thin metal or plastics, and resists collapse of the sleeve when subject to shear loads in an assembled fitting. The sleeve is secured longitudinally relative to the core as a press-fit or with adhesive. The sleeve is formed with a spring-biased protrusion 74 at the end of the sleeve furthest from the head portion 72, the protrusion being inclined for ease of insertion through apertures of the connector devices, but acting as a stop to prevent movement in a reverse axial direction unless temporarily pressed-inwards against the core.

Figure 6E:
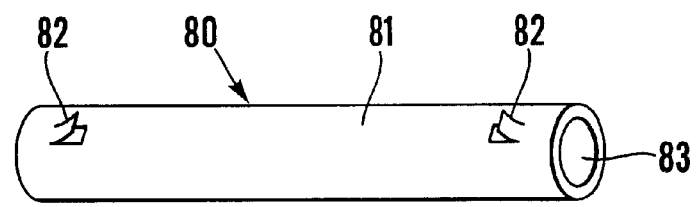
Figure 7:
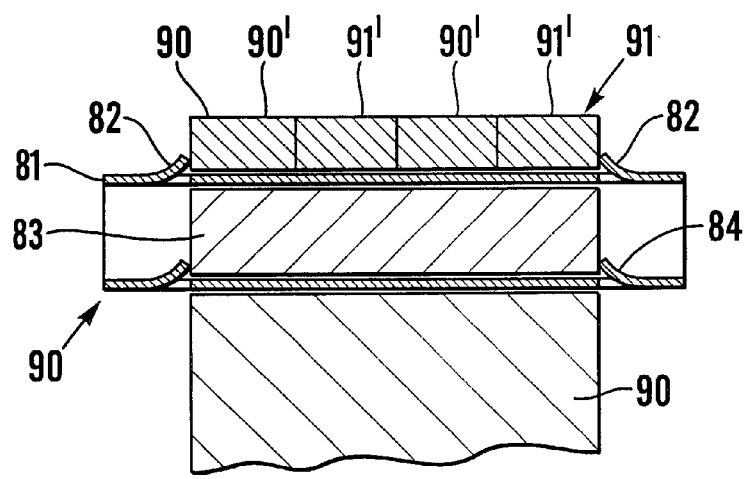
FIG. 7 shows part of an assembly which comprises the locking member of FIG. 6e.

FIG. 6e shows a variation of the locking means of FIG. 6d. The snap-fit locking means 80 omits the head portion 72 of the FIG. 6d construction, and the sleeve 81 is provided with a spring-biased protrusion 82 at each end region. The core 83 may extend for all or only part of the length of the sleeve. FIG. 7 shows parts of two connector devices 90,91 with their respective lug portions 90',91' secured together by the locking means 80 of FIG. 6e. Axial displacement of the sleeve 81 is prevented by the action of the spring biased protrusions 82 acting on side faces of the end lugs 90',91'.

Figure 8A:
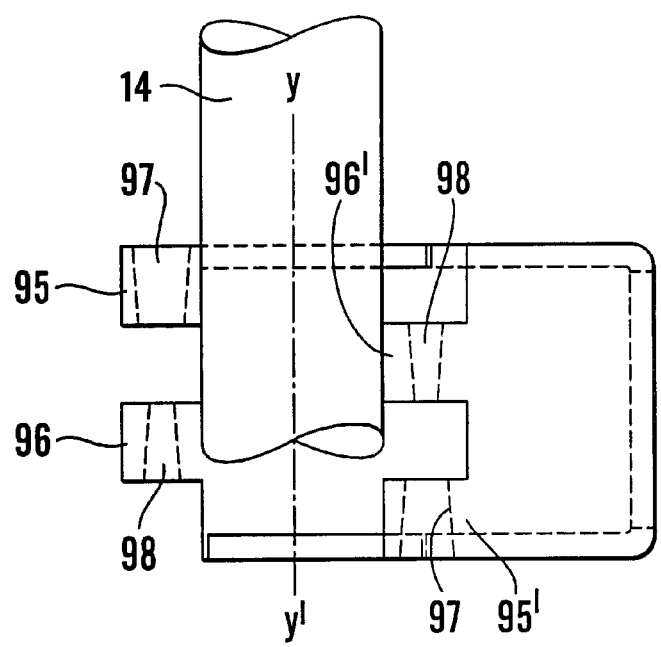
FIG. 8a is a view similar to that of FIG. 3c of a connector device in accordance with another embodiment of the invention.
Figure 8B:
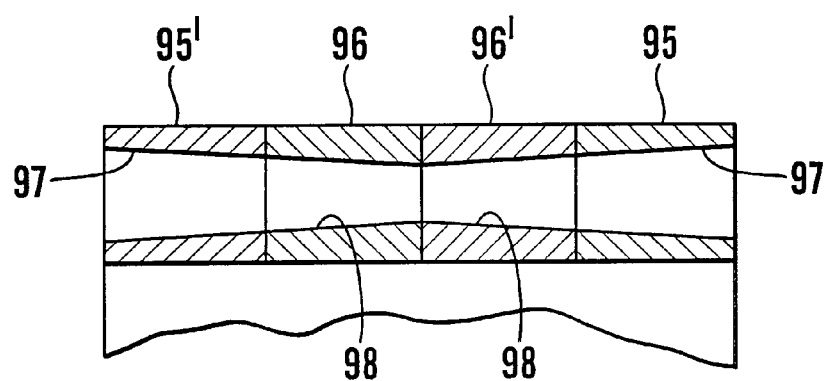
FIG. 8b shows part of an assembly of two of the connector devices of FIG. 8a, in section on the axis of an aligned series of apertures.

FIGS. 8a and 8b show a modification of the embodiment of FIGS. 2 to 5 in which apertures in the lugs are tapered (tapers not shown to scale) and arranged to receive a tapered pin of corresponding taper angle. FIG. 8a shows that the outer lugs 95,95' have tapered apertures 97 which taper with reducing diameter in a direction towards aligned inner lugs 96,96'. Inner lugs 96,96' have tapered apertures 98 which taper in an opposite direction, and with reducing diameter, towards the respective aligned outer lugs 95,95'. The maximum diameter of the apertures 98 equals the minimum diameter of the apertures 97 and hence, as shown in FIG. 8b, when two of the devices of FIG. 8a are assembled together to form two series of aligned apertures, in each series an adjacent pair of inner and outer lugs defines a through-passage zone in which a taper pin can firmly locate.

What is claimed is:

1. A connector device assembly comprising:
   at least two connector devices;
   a first and a second rigid members; and
   two locking members,
   each connector device having a first body region which defines a recess formation to accommodate a part of an outer periphery of the first rigid member of a structural assembly,
   said first rigid member having a longitudinal direction, and
   at least one of the connector devices comprising a second body region for securing relative to the second rigid member which is required to be connected to the structural assembly,
   said two connector devices each having two edge formations,
   each of said edge formations being provided with at least two lugs, said lugs each having a cylindrical aperture extending substantially parallel with the longitudinal direction of said first rigid member and spaced apart in said longitudinal direction from an adjacent lug of an associated edge formation,
   said edge formations of said two connector devices being aligned as aligned neighboring edge formations in the device assembly, each of the aligned neighboring edge formations to receive one of the locking members extending therethrough,
   the locking member in each of the aligned neighboring edge formations being a tapered pin which is an interference fit in at least one of the aligned apertures through which the locking member extends,
   the locking member being arranged in the device assembly to be loaded substantially only in shear to hold the connector devices in position relative to one another and the first rigid member, and
   at least one of the connector devices being provided with retention means operable to load each locking member in shear and to lock assembled connector devices to said first rigid member.

2. The add-on connector assembly according to claim 1, wherein the locking member is adapted to be inserted and secured in the apertures of said aligned edge formations substantially only by action applied to only one end of the locking member.

3. The add-on connector device assembly according to claim 1, wherein the locking member is selected from the group comprising a pan head rivet, and a hollow centered spring loaded pin.

4. The add-on connector assembly according to claim 1, wherein the smaller of the two end regions of the pin extends axially outwards of one of said apertures.

5. The add-on connector device assembly according to claim 1, wherein the smaller of the two end regions of the pin lies substantially wholly within the length of the aligned apertures.

6. The add-on connector device assembly according to claim 1, wherein the material of the or locking member has a hardness which is less than that of the material which defines the apertures of the connector devices.

7. The add-on connector device assembly according to claim 1, wherein the apertures are of a smooth bore.

8. Method of forming a structural assembly of two rigid members comprising use of a connector device assembly which comprises at least two connector devices, each connector device having a first body region which defines a recess formation to accommodate a part of an outer periphery of a first rigid member to be connected to a second rigid member, said first rigid member having a longitudinal direction, at least one of the connector devices comprising a second body region for securing relative to an end of a second rigid member which is required to be connected to the structural assembly, said two connector devices each having two edge formations, one said edge formation provided with at least one first cylindrical aperture extending substantially parallel with the longitudinal direction of said first rigid member and the other said edge formation provided with at least two second cylindrical apertures extending substantially parallel with the longitudinal direction of said first rigid member, and said first and second cylindrical apertures of the edge formations of said two connector devices being aligned in the device assembly to form aligned apertures to receive a locking member extending therethrough, said locking member being a tapered pin which is an interference fit in at least one of the aligned apertures through which the locking member extends, retention means associated with one of the connector devices and operable to secure an assembled plurality of connector devices in position relative to the first rigid member, wherein the method comprises first positioning the locking member to extend through the aligned apertures and to be an interference fit in one of the aligned apertures thereby to provide an interconnection of the connector devices without creating any substantial axial pre-load between the connector devices in said longitudinal direction and then operating the retention means simultaneously to secure a connector device relative to the first rigid member and apply shear load to the locking member.

9. A connector device assembly comprising:

at least two connector devices;

a first and a second rigid members; and two locking members, each connector device having a first body region which defines a recess formation to accommodate a part of an outer periphery of the first rigid member of a structural assembly, said first rigid member having a longitudinal direction, and at least one of the connector devices comprising a second body region for securing relative to the second rigid member which is required to be connected to the structural assembly, said two connector devices each having two edge formations, each of the edge formations being provided with at least one cylindrical aperture which extending substantially parallel with the longitudinal direction of said first rigid member, at least one of said edge formations provided with at least two cylindrical apertures, and the cylindrical apertures of said edge formations of said two connector devices being aligned as neighboring edge formations in the device assembly, each of the neighboring edge formations to receive one of the locking members extending therethrough, at least one locking member being a tapered pin which is an interference fit in at least one of the aligned apertures which the locking member extends, each locking member being arranged in the device assembly to be loaded substantially only in shear to hold the connector devices in position relative to one another and the first rigid member, and at least one of the connector devices being provided with retention means operable to load each locking member in shear and to lock assembled connector devices to said first rigid member.

* * * * *